United States Patent
Kerschbaum et al.

(10) Patent No.: US 7,818,200 B2
(45) Date of Patent: Oct. 19, 2010

(54) METHOD AND SYSTEM FOR PROVIDING A TRUST-BASED REPUTATION SERVICE FOR VIRTUAL ORGANIZATION FORMATION

(75) Inventors: Florian Kerschbaum, Karlsruhe (DE); Jochen Haller, Karlsruhe (DE); Yuecel Karabulut, Karlsruhe (DE); Philip Robinson, Karlsruhe (DE)

(73) Assignee: SAP AG, Walldorf (DE)

( * ) Notice: Subject to any disclaimer, the term of this patent is extended or adjusted under 35 U.S.C. 154(b) by 1274 days.

(21) Appl. No.: 11/361,284

(22) Filed: Feb. 24, 2006

(65) Prior Publication Data

US 2007/0203781 A1    Aug. 30, 2007

(51) Int. Cl.
    G06F 17/10    (2006.01)
(52) U.S. Cl. ......................... 705/10; 705/319
(58) Field of Classification Search ............. 705/10, 705/319
    See application file for complete search history.

(56) References Cited

U.S. PATENT DOCUMENTS

| | | | |
|---|---|---|---|
| 2002/0116251 A1* | 8/2002 | Chen et al. | 705/10 |
| 2004/0176993 A1* | 9/2004 | Rajasingham | 705/10 |
| 2005/0049908 A2* | 3/2005 | Hawks | 705/10 |
| 2006/0143067 A1* | 6/2006 | Calabria | 705/10 |

OTHER PUBLICATIONS

Accuracy of Metrics for Inferring Trust and Reputation in Semantic Web-Based Social Networks—by Jennifer Golbeck and James Hendler. Publisher: Springer Berlin / Heidelberg; vol. 3257/2004; Thursday, Sep. 23, 2004; Book: Engineering Knowledge in the Age of the SemanticWeb; pp. 116-131.*

* cited by examiner

Primary Examiner—Beth V Boswell
Assistant Examiner—Ernest A Jackson
(74) Attorney, Agent, or Firm—Blakely, Sokoloff, Taylor & Zafman (57) ABSTRACT

A method and system for a source participant assessing trustworthiness of a destination participant through one or more neighboring participants in a collaborative environment. The method comprises modeling all of the participants as network nodes and relationships between the participants as network paths and identifying a set of the network nodes and the network paths representing the neighboring participants that connects the network node of the source participant to the network node of the destination participant. Each of the network nodes of the neighboring participants as identified has a trust rating with best result, the trust rating is a relative measurement of feedback ratings. The trust rating of a first one of the network nodes of the neighboring participants as identified is computed with the feedback ratings between the first one of the network nodes and others of the network nodes directly connected to the first one of the network nodes. In addition, the trust rating between the first one and a second one of the network nodes is the relative measurement of the feedback ratings of the first one provided for the second one of the network nodes in comparison to the feedback ratings of the first one provided to others of the network nodes, the second one and the others of the network nodes are directly connected to the first one of the network nodes.

17 Claims, 5 Drawing Sheets

|  | Participant 50 | Participant 52 | Participant 54 | Participant 56 |
|---|---|---|---|---|
| Participant 50 | - | 100 | 1 | 5 |
| Participant 52 | 100 | - | 0 | 1 |
| Participant 54 | 1 | 6 | - | 3 |
| Participant 56 | 5 | 2 | 2 | - |

FIGURE 5

|  | Participant 50 | Participant 52 | Participant 54 | Participant 56 |
|---|---|---|---|---|
| Participant 50 | - | 0 | 0 | 2 |
| Participant 52 | 0 | - | 1 | 1 |
| Participant 54 | 0 | 1 | - | 1 |
| Participant 56 | 2 | 1 | 0 | - |

FIGURE 6

|  | Participant 50 | Participant 52 | Participant 54 | Participant 56 |
|---|---|---|---|---|
| Participant 50 | - | 0.93 | 0.01 | 0.001 |
| Participant 52 | 0.97 | - | 0.001 | 0.001 |
| Participant 54 | 0.08 | 0.08 | - | 0.001 |
| Participant 56 | 0.001 | 0.001 | 0.17 | - |

FIGURE 7

METHOD AND SYSTEM FOR PROVIDING A TRUST-BASED REPUTATION SERVICE FOR VIRTUAL ORGANIZATION FORMATION

FIELD OF THE INVENTION

An embodiment relates generally to the field of online collaboration. More particularly, an embodiment relates to a method and a system for assessing the trustworthiness of participants based on inferred trust rating.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects and offer services that could not be provided by individual organizations.

However, with the adoption of online collaboration, the boundary between homogeneously administered, trusted private networks and the uncontrollable and insecure public networks is blurred. Indeed, traditional security measures, such as techniques based on access control, are no longer sufficient in a dynamic collaborative environment.

Reputation-based systems or trust-based systems have emerged as a method for stimulating adherence to electronic contracts and for fostering trust amongst strangers in a collaborative environment, such as an e-commerce transaction. A trust-based system gathers, distributes and aggregates feedback about behavior of participants. Such trust mechanisms can provide an incentive for honest behavior and help people make decisions about who to trust. Past experience with participants can be projected into the future, giving a measure of their trustworthiness. Without such systems, where strangers are interacting in an online collaborative environment, the temptation to act deceptively for immediate gain could be more appealing than cooperation.

However, trust-based systems still encounter significant challenges. Feedback can be deleted if a participant changes name. Indeed, a dishonest participant can use this to start fresh every time it builds up a bad reputation. People may not bother to provide feedback at all, negative feedback can be difficult to elicit and it is difficult to ensure that feedback is honest. Improvements in such system for online collaboration are needed.

SUMMARY OF THE INVENTION

According to one aspect of the invention, there is provided a method for a source participant assessing trustworthiness of a destination participant through one or more neighboring participants in a collaborative environment. The method comprises modeling all of the participants as network nodes and relationships between the participants as network paths and identifying a set of the network nodes and the network paths representing the neighboring participants that connects the network node of the source participant to the network node of the destination participant. Each of the network nodes of the neighboring participants as identified has a trust rating with best result, the trust rating is a relative measurement of feedback ratings. The trust rating of a first one of the network nodes of the neighboring participants as identified is computed with the feedback ratings between the first one of the network nodes and others of the network nodes directly connected to the first one of the network nodes. In addition, the trust rating between the first one and a second one of the network nodes is the relative measurement of the feedback ratings of the first one provided for the second one of the network nodes in comparison to the feedback ratings of the first one provided to others of the network nodes, the second one and the others of the network nodes are directly connected to the first one of the network nodes.

According to a further aspect of the present invention, there is provided a system for a source participant assessing trustworthiness of a destination participant through one or more neighboring participants in a collaborative environment. The system comprises a network module for modeling all of the participants as network nodes and relationships between the participants as network paths and a trust rating computation module for identifying a set of the network nodes and the networks paths representing the neighboring participants that connects the network nodes of the source participant to the network node of the destination participant. Each of the network nodes of the neighboring participants as identified has a trust rating with best result, the trust rating is a relative measurement of feedback ratings.

Other features of the invention will be apparent from the accompanying drawings and from the detailed description that follows.

BRIEF DESCRIPTION OF THE DRAWINGS

An embodiment of the present invention is illustrated by way of example and not limitation in the figures of the accompanying drawings in which like references indicate similar elements and in which.

DETAILED DESCRIPTION

A method and system for assessing the trustworthiness of a participant in an online collaborative environment through inferred relationship. In the following description, for purposes of explanation, numerous specific details are set forth in order to provide a thorough understanding of an embodiment of the present invention. It will be evident, however, to one skilled in the art that the present invention may be practiced without these specific details.

As more organizations embrace online collaboration, the security between organizations becomes increasingly critical. By nature of the architecture of an online collaborative system, the collaborative system often provides an open and unrestricted environment for content sharing. However, this openness also makes it an ideal environment for attackers to spread malicious content. In addition, in a dynamic collaborative environment which involves participants from different security domains, traditional security measures are no longer able to cope with the security demands. Indeed, traditional security measures often involve authorizing access based on identities of the participants. Such measures become unrealistic as the identities of the participants are often unknown prior to the execution of the collaboration process.

An alternative solution to hard security system is soft security system which is based on characteristics or properties of the participants. In one embodiment of the present invention, a trust-based system is introduced to establish trust among participants without prior knowledge of each other. In general, a trust-based system uses feedback from other participants or trusted authorities to assess the trustworthiness of the peers in the community.

However, trust-based system still encounters significant challenges. Feedback can be deleted if a participant changes its name. Indeed, a dishonest participant can use this to start fresh every time it builds up a bad reputation. People may not bother to provide feedback at all, negative feedback can be difficult to elicit and it is difficult to ensure that feedback is honest.

Figure 1:
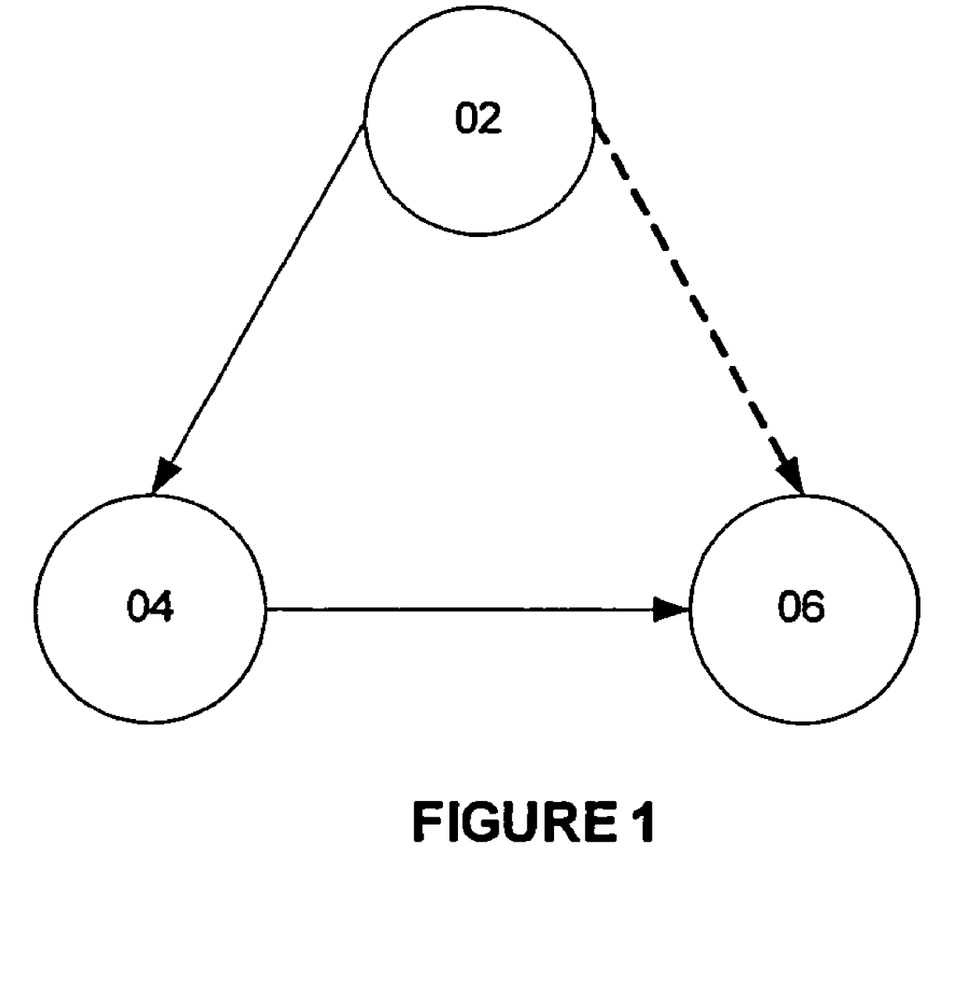
FIG. 1 is a diagram illustrating direct and inferred trust among a group of participants, in accordance with one exemplary embodiment of the invention.

FIG. 1 illustrates the concept of trust inference among a group of participants 02, 04 and 06. In the figure, participant 02 does not have any direct or prior working relationship with participant 06. Therefore, participant 02 is unable to assess the trustworthiness or reliability of participant 06 directly. However, participant 02 has a direct working relationship with participant 04 who in turn knows participant 06. Accordingly, participant 02 may infer or assess the trustworthiness of participant 06 via participant 04. The invention is based on such concept to formulate trust ratings for assessing the trustworthiness of a participant as described below.

Figure 2:
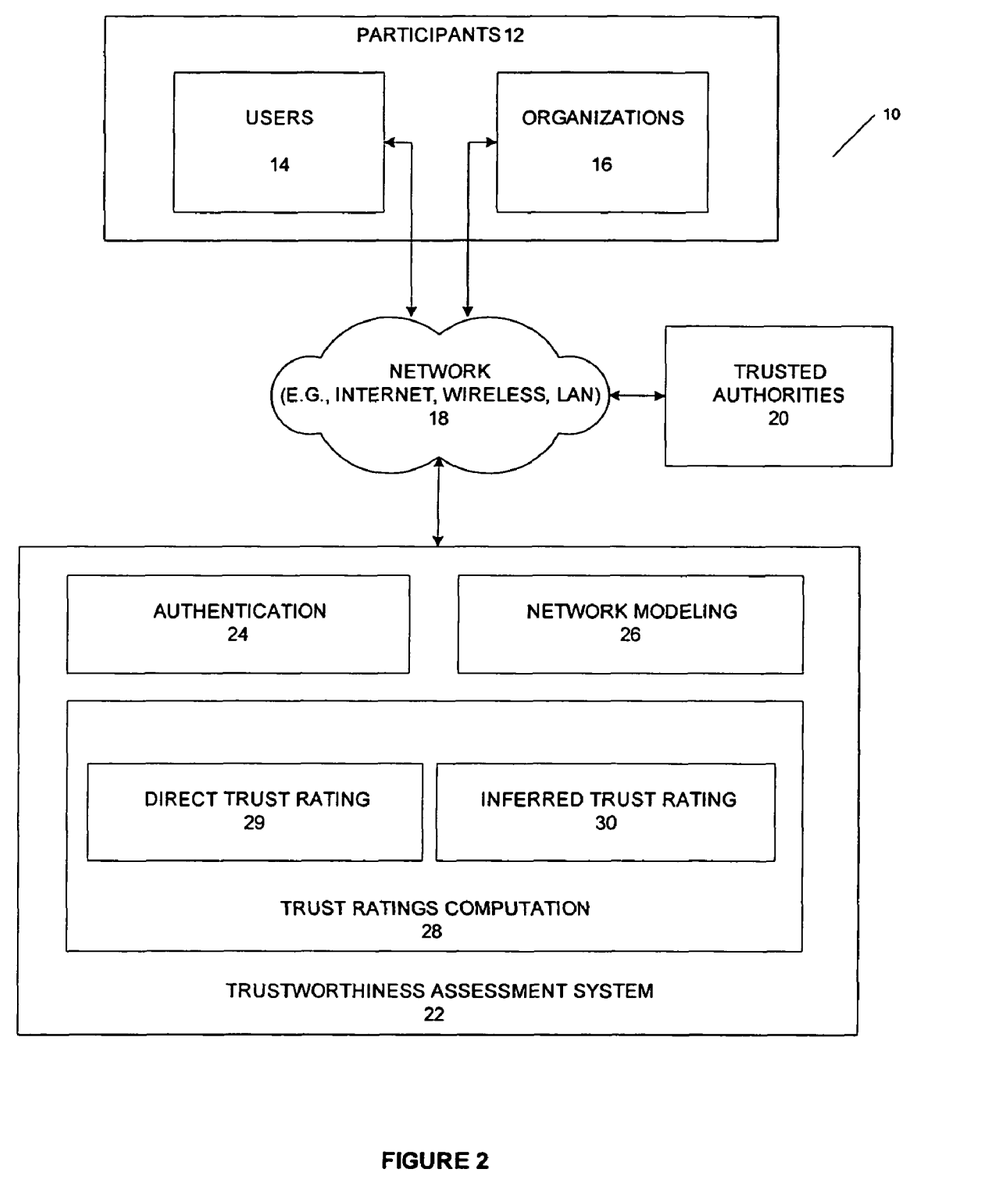
FIG. 2 is a network diagram depicting a system for assessing the trustworthiness of a participant, in accordance with one exemplary embodiment of the invention.

FIG. 2 is a network diagram depicting a network system 10 for assessing the trustworthiness of participants, in accordance with one exemplary embodiment of the invention. A trustworthiness assessment system 22 is connected to the participants 12 (such as users 14 and organizations 16) and trusted authorities 20 via a network 18 (e.g. Internet, wireless and LAN).

The trusted authorities 20 are entities that have the authority to verify the identities, qualifications and other information of the participants 12. For example, the trusted authorities 20 may include private or government organizations, regulatory boards and public or private reviewing communities. In some cases, the trusted authorities 20 are certificate authorities (CA) that issue and manage security credentials and public keys for message encryption in a Public Key Infrastructure (PKI) environment. In one example of the invention, the participants 12 may be registered with the trusted authorities 20. This deters the participants 12 from participating in the collaboration with a new false identity in events, such as, when his trust rating or reputation becomes negative. However, even if the participants 12 do not register with a trusted authority or manage to obtain false new identities, the lack of established reputation works to his disadvantage.

FIG. 2 further illustrates the trustworthiness assessment system 22 which contains an authentication module 24, network modeling module 26, trust rating computation module 28 and path trust computation module 30. In some cases, two or more of these modules may be combined into a single module, or a single module may be subdivided into multiple modules. Furthermore, the modules may be designed as an independent entity of the trustworthiness assessment system 22. The number of modules and the location of the modules in the trustworthiness assessment system 22 are not critical to the present invention.

The authentication module 24 verifies the identities and credentials of the participants 12. Various authentication methods and algorithms may be used. For example, the PKI based digital certificates issued by the trusted authorities 20 as described above.

The trustworthiness assessment system 22 further includes a network modeling module 26 that translates the participants 12 and their relationships into a network graph. For example, the participants 12 and their relationships may be represented as network nodes and network links. It will be noted that the network modeling module 26 only provides a means for representing the participants 12 and their relationships in a logical manner. Other types of data structures may be applied, for example, organizing the participants 12 and the relationships into arrays, tables or queues.

The main module of the trustworthiness assessment system 22 is the trust ratings computation module 28. As illustrated in FIG. 2, the trust ratings computation module 28 contains a direct trust rating computation element 29 and an inferred trust rating computation element 30. The direct trust rating computation element 29 provides a value that represents the trustworthiness between participants 12 that have a direct connection, that is, the participants 12 have an established relationship or the participants 12 have collaborated directly with each other. The inferred trust rating computation element 30, on the other hand, measures the trustworthiness between participants 12 with no prior established relationship. For example, turning to FIG. 1, the inferred trust rating represents the trustworthiness between participants 02 and 06 based on the trustworthiness between participants 02, 04 and that between participants 04, 06. In the invention, the direct trust rating computation module 29 provides the inferred trust rating computation module 30 with the direct trust ratings for computation. The algorithms of the direct and inferred trust rating computation in the invention will be further explained below with reference to FIGS. 4-7.

In one embodiment of the invention, the direct trust rating module 29 is designed to collect feedback ratings from the participants 12 (not illustrated). The feedback ratings may be based on the overall performance or specific characteristics of the participants 12, such as financial stability, operation efficiency and customer service. Various ratings scale systems may be applied, for example, staple scale and semantic differential scale.

Figure 3:
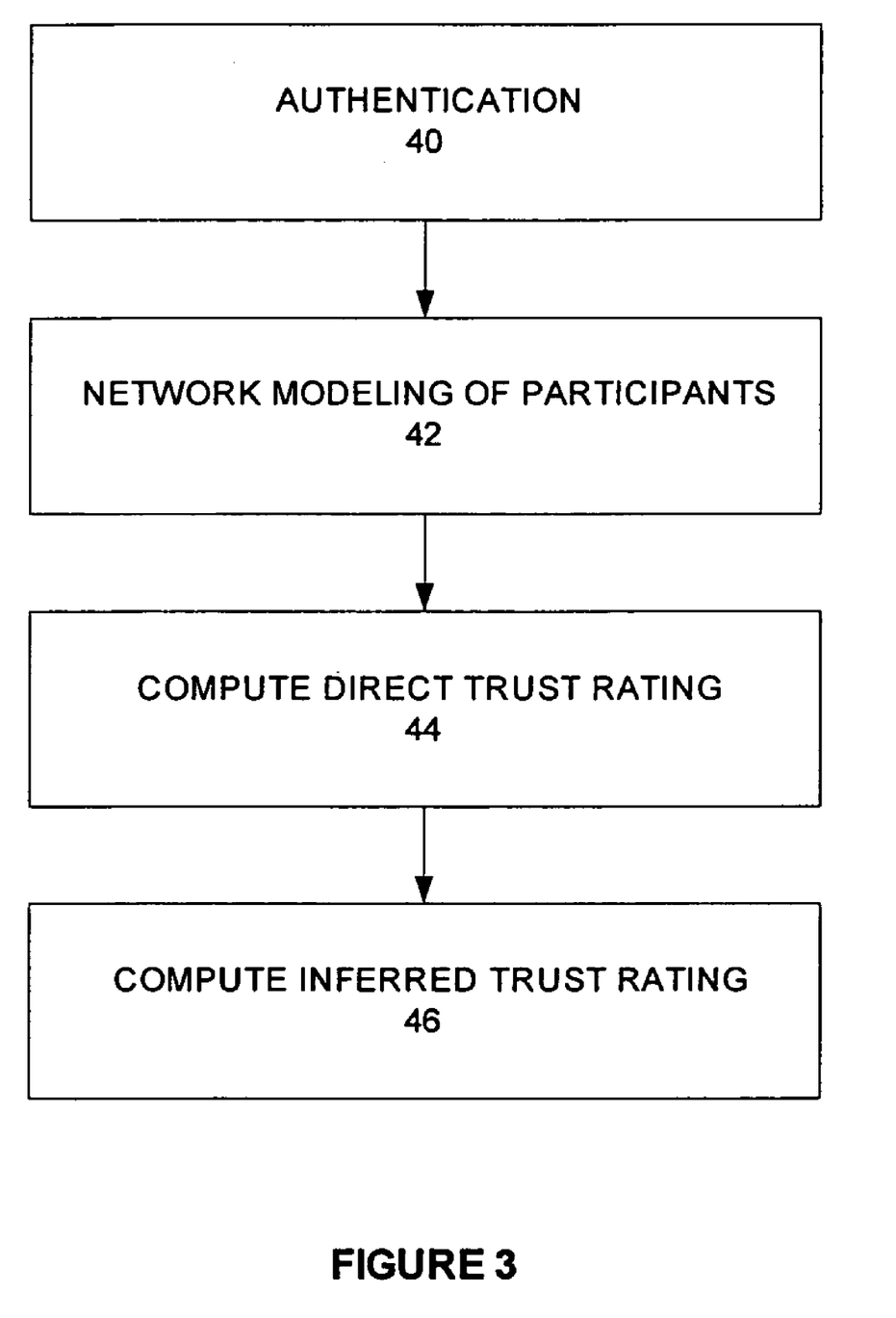
FIG. 3 is a flowchart illustrating a method for assessing the trustworthiness of a participant, in accordance with one exemplary embodiment of the invention.

FIG. 3 is a flowchart illustrating a method for assessing the trustworthiness of the participants 12 based on inferred relationships, in accordance with one exemplary embodiment of the invention. The process begins with block 40 whereby the identities and qualifications of the participants 12 are verified. For example, in a particular collaboration, the participants 12 may be required to submit proof that the business operations of the participants 12 meet the International Organization for Standardization (ISO). Once the verification process has been completed, the participants 12 and their relationships are represented as a network graph in block 42. The direct and inferred trust ratings are further computed in blocks 44 and 46 respectively.

Figure 4:
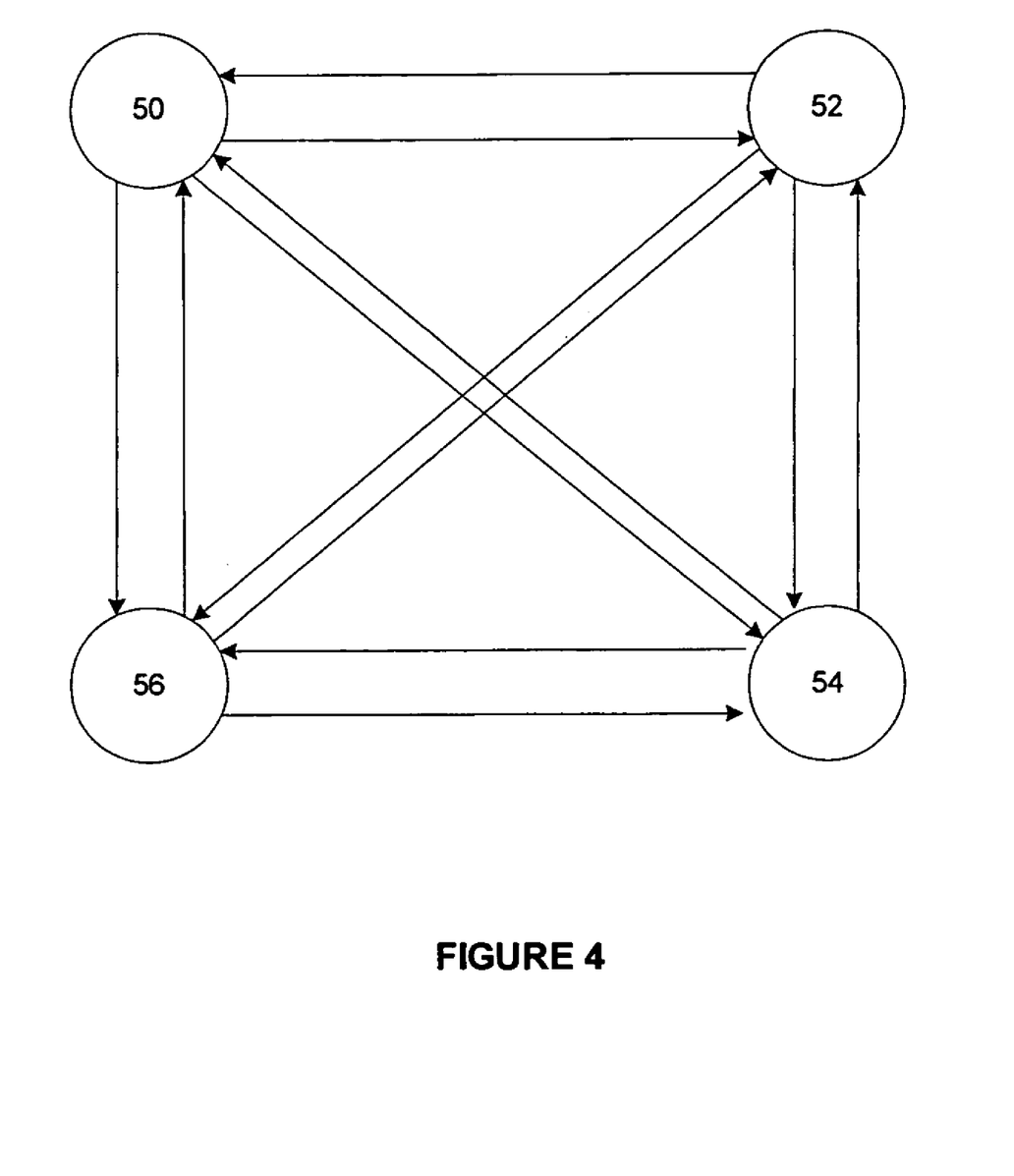
FIG. 4 is a network graph illustrating participants and their relationships, in accordance with one exemplary embodiment of the invention.

FIG. 4 is a network diagram illustrating the participants 50, 52, 54, 56 and their relationships. In one example, the participant 56 can further assess the trustworthiness of participant 52 via participants 50 or 54. Furthermore, to further illustrate the algorithm of the invention, the participant 56 has a direct relationship with participant 52. Accordingly, this example allows the participant 56 to assess the trustworthiness of participant 52 via inferred trust ratings or direct trust ratings.

Figure 5:
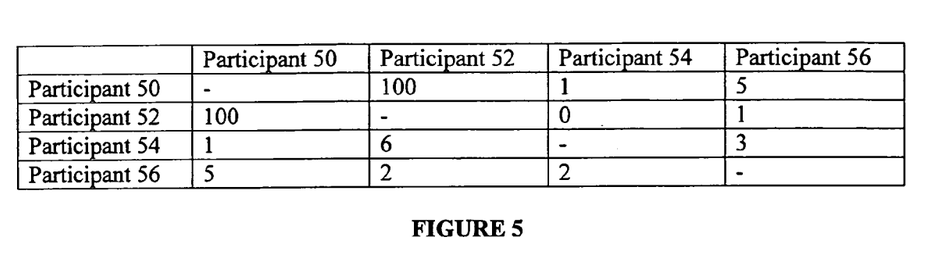
FIGS. 5 and 6 are tables representing accumulative positive and negative feedback ratings of each of the participants as illustrated in FIG. 4, in accordance with one exemplary embodiment of the invention.
Figure 6:
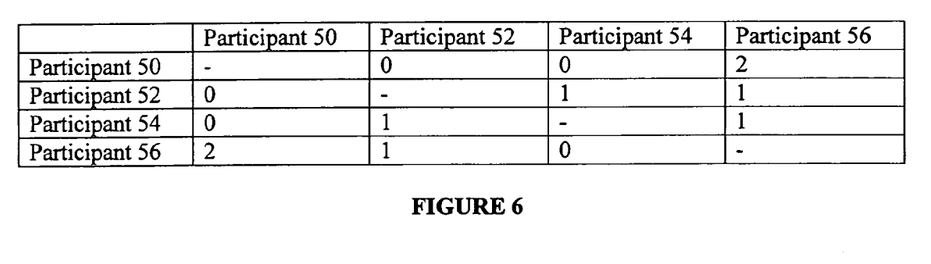

FIGS. 5 and 6 summarize the cumulated positive and negative feedback ratings that each participant 50, 52, 54 and 56 provides for one another as illustrated in FIG. 4. For example, participant 50 rates participant 52 and 54 with accumulated positive feedback value of 100 and 1 respectively (FIG. 5). The feedback value may be based on the actual number of positive and negative feedbacks received by the participants 50, 52, 54 and 56. Alternatively, the feedback value may be expressed as a percentage of the total number of collaboration with that particular participant. Indeed, various types of feedback rating scales and systems that effectively differentiate the quality of the participants 12 may be applied in the invention.

In this example, participants 50 and 52 are a set of attackers collaborating to boost their trustworthiness by providing deceptive positive and negative feedback for each other. The participants 50 and 52 rate each other with accumulated positive feedback value of 100 and negative feedback value of 0 (FIGS. 5 and 6 respectively). The algorithm of the invention is designed to compute inferred trust rating such that the inferred trust rating is unaffected by such deceptive feedback. The direct trust rating between two participants i, j who has an established relationship is computed based on the following equation:

$$Cij = \max\left[0.001, \frac{pos[i,j] - \max\left(1, \sum_{k=0}^{i} pos[i,k] / \sum_{k=0}^{n} neg[i,k]\right) \cdot neg[i,j]}{\sum_{k=0}^{n} (pos[i,k] + neg[i,k])}\right]$$

It will be noted that the direct trust rating, $C_{ij}$, between two participants i and j is a function of the cumulated positive, pos[ij], and negative feedback rating, neg[i,j]. In addition, the direct trust rating is lower-bound by 0.001 and normalized by the number of total direct relationships that the participant has established. Therefore, the direct trust value is limited to the interval of 0.001 and 1. It will also be noted that the direct trust rating provides a relative measure of trustworthiness. For example, the feedback ratings of participant 54 provided by participant 56 are compared to the feedback ratings for other participants, such as participant 50 and 52. Stated differently, the feedback ratings of participant 54 provided by participant 56 are compared to the overall trustworthiness experience which the participant 56 has of other participants.

Figure 7:
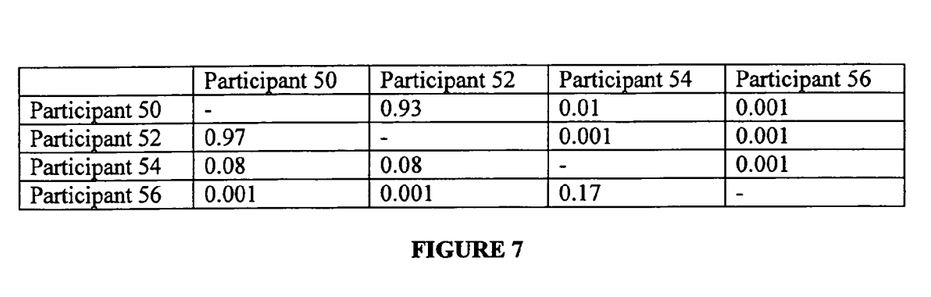
FIG. 7 is a table containing the computed direct trust rating of the participants based on the cumulated positive and negative feedback ratings as represented in FIGS. 5 and 6 respectively, in accordance with one exemplary embodiment of the invention.

FIG. 7 further illustrates the direct trust ratings computed for all the participants 50, 52, 54, 56 based on the above equation. Alternatively, the algorithm may compute the direct trust rating progressively with the participants having the best direct trust rating. For example, the computation of the direct trust rating begins with the source participant 56 and its immediate neighboring participants 50 and 54. The trust rating between participants 56 and 50 is 0.001, participants 56 and 54 is 0.17 and participants 56 and 52 is 0.001. The algorithm compares the direct trust rating and proceeds with participant 54 who has a higher direct trust rating. Next, the algorithm computes the direct trust rating between participant 54 and the destination participant 52. Such identification of the network nodes and the network paths of the neighboring participants may be based on Dijkstra's shortest path algorithm.

The inferred trust rating is computed based on the best direct trust rating of each participant between the source and destination participants. This can be summarized based on the following equation whereby the inferred trust rating from participant i to participant k via participant j as:

$$W_{<i,j,k>} = C_{ij} \cdot C_{jk}$$

Therefore, referring to the above example, the inferred trust rating from source participant 56 to destination participant 52 via participant 54 is a function of the direct trust ratings of 0.17 and 0.08.

The algorithm discourages deceptive feedback ratings between participants as the deceptive feedback ratings do not increase the inferred trust ratings from the source participant to the destination participant. Referring to FIG. 7, the inferred trust ratings between the source participant 56 and the destination participant 52 via participant 50 is a function of 0.001 and 0.93 and therefore has a value of 0.00093. The inferred trust rating is lower than that via participant 54 which is 0.0136. Stated differently, participant 56 assesses the trustworthiness of the participant 52 via participant 54 rather than participant 50. Consequently, the path between an honest participant and the attacker is only strengthened if they engage in real transaction with each other.

It will be noted that the direct and inferred trust ratings provided by the invention may be further modified to assess the trustworthiness of the participants 12. For example, the direct or inferred trust ratings of the participants 12 may be further compared with a threshold value. The participants 12 are considered trust worthy only if the ratings meet the threshold value. Alternatively, the direct trust ratings may be considered together with the inferred trust ratings when assessing the trustworthiness of the participants 12. Referring to the above example as illustrated in FIGS. 4-7, participants 56 and 52 have a direct trust rating of 0.001 and a best inferred trust rating of 0.0136 via participant 54. Participant 56 may consider both ratings to assess the trustworthiness of participant 52. For example, both the direct and inferred trust ratings must meet a certain threshold value respectively or in combination.

Thus, a method and system for assessing the trustworthiness of the participants in an on-line collaborative environment by inferred trust rating has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method in a trustworthiness assessment system for assessing trustworthiness of a plurality of participants in a collaborative environment, wherein the computer-implemented method comprises:

modeling, via a network modeling module of the trustworthiness assessment system, all of the plurality of participants as network nodes;

modeling, via the network modeling module, relationships between the plurality of participants as network paths;

identifying, via the network modeling module, a set of network nodes and associated network paths representing neighboring participants connecting a network node of a source participant with a network node of a destination participant;

computing with a trust ratings computation module of the trustworthiness assessment system, a trust rating that represents trustworthiness between the source participant and the destination participant, wherein the trust rating is based on an assessment of an inferred trust rating based on a level of trustworthiness between the destination participant and the neighboring participants connecting the source participant to the destination participant, and wherein the source participant and the destination participant have no prior established relationship directly between the source participant and the destination participant; and wherein computing the trust rating that represents trustworthiness between the source participant and the destination participant comprises computing the trust rating based on implementation of a function of $C_{ij}$ by the trust ratings computation module wherein a trust rating C between two participants i and j is a function of cumulated positive feedback pos[i,j], and cumulated negative feedback neg[i,j], and wherein the trust rating is further normalized by a number of total direct relationships established by the $$Cij = \max\left[0.001, \frac{pos[i, j] - \max\left(1, \sum_{k=0}^{l} pos[i, k] / \sum_{k=0}^{n} neg[i, k]\right) \cdot neg[i, j]}{\sum_{k=0}^{n}(pos[i, k] + neg[i, k])}\right].$$

2. The computer-implemented method of claim 1, wherein the computed trust rating is based further on feedback ratings between a first one of the network nodes corresponding to the destination participant and one or more other network nodes directly connected to the first one of the network nodes.

3. The computer-implemented method of claim 2, wherein the feedback ratings comprise positive or negative feedback based on a transaction between the first one of the network nodes corresponding to the destination participant and one or more of the other network nodes directly connected to the first one of the network nodes due to a direct working relationship between the first one of the network nodes and one or more of the other network nodes.

4. The computer-implemented method of claim 2, wherein the trust rating with a best result between the first one and a second one of the network nodes represents a most trustworthy relationship between the first one of the network nodes and a node among the one or more other network nodes directly connected to the first one of the network nodes.

5. The computer-implemented method of claim 1, wherein the identifying of the network nodes and the associated network paths of the neighboring participants is based on Dijkstra's shortest path algorithm.

6. The computer-implemented method of claim 1, wherein the collaborative environment comprises the source participant and the destination participant each existing within separate and distinct security domains, and further wherein the source participant and the destination participant are unknown to each other prior to execution of the computer-implemented method.

7. The computer-implemented method of claim 1:
wherein computing the trust rating that represents trustworthiness between the source participant and the destination participant comprises computing the trust rating based on security credentials and/or public keys for message encryption provided via a certificate authority; and
wherein lack of established registration with the certificate authority disadvantages the destination participant as represented within the trust rating computed by the trust ratings computation module.

8. The computer-implemented method of claim 1, wherein computing the trust rating that represents trustworthiness between the source participant and the destination participant comprises computing a trust rating based on an assessment of a direct established relationship and/or direct collaboration between the source participant and one or more of the neighboring participants connecting the network node of the source participant with the network node of the destination participant.

9. A system to assess trustworthiness of a plurality of participants in a collaborative environment, the system comprising:
a computer with at least a processor, network modeling module to: model all of the plurality of participants as network nodes, and model relationships between the plurality of participants as network paths;
a trust rating computation module to identify a set of network nodes and associated network paths representing neighboring participants connecting network node of a source participant with a network node of a destination participant; and
wherein the trust rating computation module is to further compute a trust rating that represents trustworthiness between the source participant and the destination participant, wherein the trust rating is based on an assessment of an inferred trust rating based on a level of trustworthiness between the destination participant and the neighboring participants connecting the source participant to the destination participant, and wherein the source participant and the destination participant have no prior established relationship directly between the source participant and the destination participant, and further wherein the trust rating is based on implementation of a function of $C_{ij}$, wherein a trust rating C between two participants i and j is a function of cumulated positive feedback pos[i,j], and cumulated negative feedback neg[i,j], and wherein the trust rating is further normalized by a number of total direct relationships established by the destination participant Where:

$$Cij = \max\left[0.001, \frac{pos[i, j] - \max\left(1, \sum_{k=0}^{l} pos[i, k] / \sum_{k=0}^{n} neg[i, k]\right) \cdot neg[i, j]}{\sum_{k=0}^{n}(pos[i, k] + neg[i, k])}\right].$$

10. The system of claim 9, wherein the computed trust rating is based further on feedback ratings between a first one of the network nodes corresponding to the destination participant and one or more other network nodes directly connected to the first one of the network nodes.

11. The system of claim 10, wherein the feedback ratings comprise positive or negative feedback based on a transaction between the first one of the network nodes corresponding to the destination participant and one or more of the other network nodes directly connected to the first one of the network nodes due to a direct working relationship between the first one of the network nodes and one or more of the other network nodes.

12. The system of claim 10, wherein the trust rating with the best result between the first one and a second one of the network nodes represents a most trustworthy relationship between the first one of the network nodes and the other network nodes directly connected to the first one of the network nodes.

13. The system of claim 9, wherein the identifying of the network nodes and the network paths of the neighboring participants is based on Dijkstra's shortest path algorithm.

14. A non-transitory machine-readable medium comprising instructions, which when executed by a machine, cause the machine to perform a method of assessing trustworthiness of a plurality of participants in a collaborative environment, wherein the method comprises:
  modeling, via a network modeling module of the trustworthiness assessment system, all of the plurality of participants as network nodes;
  modeling, via the network modeling module, relationships between the plurality of participants as network paths;
  identifying, via the network modeling module, a set of network nodes and associated network paths representing neighboring participants connecting a network node of a source participant with a network node of a destination participant;
  computing with a trust ratings computation module of the trustworthiness assessment system, a trust rating that represents trustworthiness between the source participant and the destination participant, wherein the trust rating is based on an assessment of an inferred trust rating based on a level of trustworthiness between the destination participant and the neighboring participants connecting the source participant to the destination participant, and wherein the source participant and the destination participant have no prior established relationship directly between the source participant and the destination participant; and
  wherein computing the trust rating that represents trustworthiness between the source participant and the destination participant comprises computing the trust rating based on implementation of a function of $C_{ij}$ by the trust ratings computation module wherein a trust rating C between two participants i and j is a function of cumulated positive feedback pos[i,j], and cumulated negative feedback neg[i,j], and wherein the trust rating is further normalized by a number of total direct relationships established by the destination participant Where:

$$Cij = \max\left[0.001, \frac{pos[i,j] - \max\left(1, \sum_{k=0}^{l} pos[i,k] \Big/ \sum_{k=0}^{n} neg[i,k]\right) \cdot neg[i,j]}{\sum_{k=0}^{n}(pos[i,k] + neg[i,k])}\right].$$

15. The machine-readable medium of claim 14, wherein the computed trust rating is based further on feedback ratings between a first one of the network nodes corresponding to the destination participant and one or more other network nodes directly connected to the first one of the network nodes.

16. The machine-readable medium of claim 15, wherein the feedback ratings comprise positive or negative feedback based on a transaction between the first one of the network nodes corresponding to the destination participant and one or more of the other network nodes directly connected to the first one of the network nodes due to a direct working relationship between the first one of the network nodes and one or more of the other network nodes.

17. The machine-readable medium of claim 15, wherein the trust rating with the best result between the first one and a second one of the network nodes represents a most trustworthy relationship between the first one of the network nodes and the other network nodes directly connected to the first one of the network nodes.

* * * * *